United States Patent
Pulle et al.

(10) Patent No.: US 11,774,542 B2
(45) Date of Patent: Oct. 3, 2023

(54) SYSTEMS AND METHODS FOR REMOTE MONITORING CARE USING WIRELESS SENSING TECHNOLOGIES

(71) Applicants: Viswanath Pulle, Verdun (CA); Mathieu Rozon, Vaudreuil-Dorion (CA); Azar Zandifar, Outremont (CA); Shwetha Hymavathi Yadavalli, Verdun (CA); Vahid Reza Asghari, Montreal (CA); Amir Minayi Jalil, Verdun (CA); Mark Hopper, Montreal (CA); Negar Ghourchian, Montreal (CA); Michel Allegue Martinez, Terrebonne (CA)

(72) Inventors: Viswanath Pulle, Verdun (CA); Mathieu Rozon, Vaudreuil-Dorion (CA); Azar Zandifar, Outremont (CA); Shwetha Hymavathi Yadavalli, Verdun (CA); Vahid Reza Asghari, Montreal (CA); Amir Minayi Jalil, Verdun (CA); Mark Hopper, Montreal (CA); Negar Ghourchian, Montreal (CA); Michel Allegue Martinez, Terrebonne (CA)

( * ) Notice: Subject to any disclaimer, the term of this patent is extended or adjusted under 35 U.S.C. 154(b) by 222 days.

(21) Appl. No.: 17/314,447

(22) Filed: May 7, 2021

(65) Prior Publication Data
US 2021/0263129 A1    Aug. 26, 2021

Related U.S. Application Data

(63) Continuation-in-part of application No. 17/199,952, filed on Mar. 12, 2021, now Pat. No. 11,348,428, and
(Continued)

(51) Int. Cl.
*H04W 64/00* (2009.01)
*G01S 5/02* (2010.01)
(Continued)

(52) U.S. Cl.
CPC ............... *G01S 5/021* (2013.01); *G01S 5/02* (2013.01); *G01S 5/0221* (2013.01); *H04B 17/21* (2015.01); *H04B 17/27* (2015.01); *H04W 64/00* (2013.01)

(58) Field of Classification Search
CPC .................................................... H04W 64/00
(Continued)

(56) References Cited

U.S. PATENT DOCUMENTS

| | | | |
|---|---|---|---|
| 10,244,479 B1 * | 3/2019 | Backholm | H04W 52/0251 |
| 2016/0151603 A1 * | 6/2016 | Shouldice | G16H 20/30 |
| | | | 600/26 |

(Continued)

*Primary Examiner* — Joseph Arevalo
(74) *Attorney, Agent, or Firm* — Rosenberg, Klein & Lee (57) ABSTRACT

System and methods of a mobile application to remotely monitor residents with device-free sensing of human motion over Wi-Fi is provided. A detailed behavioral analysis of various functions related to the sleep and activity of the subject has been provided. The Remote Care Application (RCA) is a mobile application on several platforms that displays the results of all the analysis and behavioral patterns obtained from the motion from the subject. The system relies on existing wireless communication signals and machine learning techniques in order to automatically detect the motion of the subject, sleep analysis of the subject, activity analysis of the subject.

15 Claims, 8 Drawing Sheets

Related U.S. Application Data a continuation-in-part of application No. 17/019,759, filed on Sep. 14, 2020, now Pat. No. 11,212,650, and a continuation-in-part of application No. 16/922,251, filed on Jul. 7, 2020, now Pat. No. 11,150,320, said application No. 17/019,759 is a continuation of application No. 16/461,492, filed as application No. PCT/CA2017/000247 on Nov. 21, 2017, now Pat. No. 10,779,127, application No. 17/314,447 is a continuation-in-part of application No. 16/303,301, filed as application No. PCT/CA2017/000136 on May 31, 2017, now Pat. No. 11,043,094, said application No. 16/922,251 is a continuation of application No. 15/493,616, filed on Apr. 21, 2017, now Pat. No. 10,705,179.

(60) Provisional application No. 63/048,300, filed on Jul. 6, 2020, provisional application No. 63/021,255, filed on May 7, 2020, provisional application No. 62/988,846, filed on Mar. 12, 2020, provisional application No. 62/425,267, filed on Nov. 22, 2016, provisional application No. 62/347,217, filed on Jun. 8, 2016, provisional application No. 62/326,231, filed on Apr. 22, 2016.

(51) Int. Cl.
   *H04B 17/21*     (2015.01)
   *H04B 17/27*     (2015.01)

(58) Field of Classification Search
   USPC ....... 455/434, 456.2, 404.1, 574, 411, 456.3, 455/39, 418, 552.1, 458, 569.1, 285, 455/67.11, 41.1, 296, 139
   See application file for complete search history.

(56) References Cited

U.S. PATENT DOCUMENTS

| | | | |
|---|---|---|---|
| 2016/0373588 A1* | 12/2016 | Raleigh | H04L 12/1407 |
| 2017/0243485 A1* | 8/2017 | Rubin | G08G 1/052 |
| 2019/0236510 A1* | 8/2019 | Kwak | G07C 5/0841 |
| 2019/0236863 A1* | 8/2019 | Kwak | G07C 5/0808 |
| 2019/0260879 A1* | 8/2019 | Raleigh | H04M 15/83 |

* cited by examiner

SYSTEMS AND METHODS FOR REMOTE MONITORING CARE USING WIRELESS SENSING TECHNOLOGIES

CROSS-REFERENCE TO RELATED APPLICATIONS

This application claims the benefit of priority from U.S. Provisional Patent Application 63/021,255 filed May 7, 2020 entitled "Systems and Methods for Remote Monitoring Care using Wireless Sensing Technologies," the entire contents of which are incorporated herein by reference.

This application claims the benefit of priority as a continuation-in-part from U.S. patent application Ser. No. 16/922,251 filed Jul. 7, 2020 entitled "Device-Free Subject Localization Methods and Systems using Wireless Signals," which itself claims the benefit of priority from U.S. patent application Ser. No. 15/493,616 filed Apr. 21, 2017 which has issued as U.S. Pat. No. 10,705,179, which itself claims the benefit of priority from U.S. Provisional Patent Application 62/326,231 filed Apr. 22, 2016, the entire contents of each being incorporated herein by reference.

This application claims the benefit of priority as a continuation-in-part from U.S. patent application Ser. No. 17/019,759 filed Sep. 14, 2020 entitled "Device-Free Localization Methods within Smart Indoor Environments," which itself claims the benefit of priority from U.S. patent application Ser. No. 16/461,492 filed May 16, 2019 which has issued as U.S. Pat. No. 10,779,127, which itself claims the benefit of priority from PCT/CA2017/000,247 filed Nov. 21, 2017, which itself claims the benefit of priority from U.S. Provisional Patent Application 62/425,267 filed Nov. 22, 2016, the entire contents of each being incorporated herein by reference.

This application claims the benefit of priority as a continuation-in-part from U.S. patent application Ser. No. 16/303,301 filed Nov. 20, 2018 entitled "System and Methods for Smart Intrusion Detection using Wireless Signals and Artificial Intelligence," which itself claims the benefit of priority from PCT/CA2017/000,136 filed May 31, 2017, which itself claims the benefit of priority to U.S. Provisional Patent Application 62/347,217 filed Jun. 8, 2016, the entire contents of each being incorporated herein by reference.

This application claims the benefit of priority as a continuation-in-part from U.S. application Ser. No. 17/199,952 filed Mar. 12, 2021 entitled "System and Methods for Identifying a Subject Through Device-Free and Device-Orientated Sensing Technologies" which itself claims the benefit of priority from U.S. Provisional Patent Application 62/988,846 filed Mar. 12, 2020, the entire contents of each being incorporated herein by reference.

This application claims the benefit of priority as a continuation-in-part of U.S. Provisional Patent Application 63/048,300 filed Jul. 6, 2020 entitled "Systems and Methods for Occupancy Detection using WiFi Sensing Technologies," the entire contents of which are incorporated herein by reference.

FIELD OF THE INVENTION

This invention relates to the remote monitoring of individuals with a mobile application using a passive sensing technology within a wireless environment and more particularly to the monitoring of individuals such as the elderly by exploiting device-oriented wireless technology based tracking to provide monitoring and activity information to families, care givers, family physicians, enterprises, organizations and service providers.

BACKGROUND OF THE INVENTION

Timely intervention with respect to an elderly person's healthcare requires the collaboration of several stakeholders. The technology monitoring the individuals activity trends and generating alerts, the healthcare provider networks for oversight, integrated care facilities and trusted consumer healthcare brands must all be aligned to achieve the desired outcome, namely the timely outreach to the elderly person at the point they require assistance.

Within the prior art this monitoring technology is a physical device which, in order to the desired monitoring objective, must be worn or carried by the elderly person. Typically, such devices are pendant style devices worn around the person's neck or a wrist worn device. However, the failure of the elderly person to carry or wear the monitoring device, a common occurrence given the elderly persons degraded or degrading mental faculties, represents a single point of failure in this stakeholder collaboration as absent the monitoring device no monitoring of the elderly persons actual activity or physiological condition occurs. Similarly, a drained battery represents a single point of failure even when the monitoring device is worn or carried by the elderly person. In either case these single point of failures within the monitoring system can result in an outcome which is life threatening or fatal. In other instances, these single points of failure can result in essential services being incorrectly deployed wasting time, money and potentially limiting their availability to another individual in real need of their services.

A variety of monitoring data may be appropriate such as behavioral analysis of sleep patterns, activity monitoring, motion detection etc. are crucial in remote provisioning of care to the elderly in order to detect and/or predict anomalies to trigger an intervention. Accordingly, it would be beneficial to establish methods, systems and networks which allow for the monitoring the regular behaviour of the elderly remotely without suffering from these single points of failure. Such regular monitoring can be employed to establish specific discrete anomalies requiring specific discrete emergency intervention as well as provide essential information allowing for extended non-emergency interventions to help detect and/or mitigate the onset of disease, physiological conditions or psychological conditions.

Today we live in a world where wireless networks and wireless interfaced devices are a ubiquitous part of everyday life. Many current wireless communication systems such as LTE, LTE-Advance, IEEE 802.11n, IEEE 802.11ac (Wi-Fi 5), and IEEE 802.11ax (Wi-Fi 6) continuously sense the state of the wireless channel through well-known signals, or pilot signals, in order to dynamically optimize the transmission rate or improve the robustness of the system. These channel sensing mechanisms are continuously improving and enable self-driven calibration systems and wireless signal pre-compensation and post-compensation techniques, which significantly improve the quality of wireless communication.

Additionally, fine-grained information is increasingly available in modern communication systems and several approaches have been proposed in order to improve these systems. For example, a method that provides periodic channel state information (CSI) data has been developed. However, these fine-grained measurements are not only valuable for controlling and optimizing the communication networks and links themselves but can also be used to detecting the presence and/or motion of individuals within a sensing area or an activity being undertaken by an individual within the sensing area.

Several wireless signals are broadcast or emitted in the form of frames by the stations (STAs) and Access Points (APs) in wireless networks, for example Wi-Fi networks, without requiring association between the STAs and APS. Before two devices, such as a STA and an AP for example, can associate with each other they can each read frames from the wireless environment and each of them can decide to broadcast or send one or multiple frames or wireless signals in general.

Accordingly, it would be beneficial to exploit the wireless environment and the sensing, monitoring, communications protocols of one or more wireless networks within an environment to provide the monitoring required of elderly individuals such that the single points of failure of their having to wear or carry a specific monitoring device(s) or failure of the battery within the specific monitoring device(s) are eliminated.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to the remote monitoring of individuals with a mobile application using a passive sensing technology within a wireless environment and more particularly to the monitoring of individuals such as the elderly by exploiting device-oriented wireless technology based tracking to provide monitoring and activity information to families, care givers, family physicians, enterprises, organizations and service providers.

In accordance with an embodiment of the invention there is provided a method comprising:

acquiring data relating to wireless signals exchanged between a plurality of wireless devices within an environment;

processing the acquired data with one or more processing modules of a plurality of processing modules to establish one or more characteristics relating to one or more users within the environment;

generating one or more summaries of a plurality of summaries in dependence upon the outputs of the plurality of processing modules; wherein each summary of the plurality of summaries employs outputs of a predetermined subset of the plurality of processing modules.

In accordance with an embodiment of the invention there is provided a device comprising: a processor executing computer executable instructions connected to a network; a memory storing the computer executable instructions; and another memory storing data acquired from a plurality of wireless devices; wherein the data relates to wireless signals exchanged between the plurality of wireless devices;

the plurality of wireless devices are associated within an environment; and the computer executable instructions when executed by the process configure the device to execute a process comprising the steps of:

processing the acquired data with one or more processing modules of a plurality of processing modules to establish one or more characteristics relating to one or more users within the environment;

generating one or more summaries of a plurality of summaries in dependence upon the outputs of the plurality of processing modules; wherein each summary of the plurality of summaries employs outputs of a predetermined subset of the plurality of processing modules.

In accordance with an embodiment of the invention there is provided a method comprising generating at least one of a trend and an anomaly with respect to a characteristic of a user in dependence upon processing acquired data relating to wireless signals exchanged between a plurality of wireless devices within an environment associated with the user.

In accordance with an embodiment of the invention there is provided a method comprising generating data to be rendered to an individual with respect to a characteristic of a user in dependence upon processing acquired data relating to wireless signals exchanged between a plurality of wireless devices within an environment associated with the user.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

BRIEF DESCRIPTION OF THE DRAWINGS

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "subject" as used herein may refer to, but is not limited to, an individual or group of individuals. This includes, but is not limited to, private individuals, employees of organizations and/or enterprises, an unknown individual or an intruder, members of community organizations, members of charity organizations, men, women, and children. In its broadest sense the user may further include, but not be limited to, software systems, mechanical systems, robotic systems, android systems, etc. that may be characterized, i.e. identified, by one or more embodiments of the invention.

A "transmitter" (a common abbreviation for a radio transmitter or wireless transmitter) as used herein may refer to, but is not limited to, an electronic device which, with the aid of an antenna, produces radio waves. The transmitter itself generates a radio frequency alternating current containing the information to be transmitted which is applied to the antenna which radiates radio waves. A transmitter may be discrete or it may form part of a transceiver in combination with a receiver. Transmitters may be employed within a variety of electronic devices that communicate by wireless signals including, but not limited to, PEDs, FEDs, two-way radios, and wireless beacons. A transmitter may operate according to one or more wireless protocols in dependence upon its design.

A "receiver" (a common abbreviation for a radio receiver or wireless receiver) as used herein may refer to, but is not limited to, an electronic device that receives radio waves via an antenna which converts them to a radio frequency alternating current wherein the receiver processes these signals to extract the transmitted information. Receivers may be employed within a variety of electronic devices that communicate by wireless signals including, but not limited to, PEDs, FEDs, two-way radios, and wireless beacons. A receiver may operate according to one or more wireless protocols in dependence upon its design.

A "wireless transceiver" as used herein may refer to, but is not limited to, a transmitter and a receiver comprising components needed for sending and receiving wireless signals, e.g. antenna, amplifiers, filters, mixers, local oscillators, ADC and DAC, and any other component required in the modulator and demodulator.

"Device-free technology" as used herein may refer to, but is not limited to, a system for detecting and/or identifying target user(s) or the subject(s) which does not require to wear any device with him/her/them in order for the system or the technology to know that there is human motion in the sensing area or to detect the type of activities or not that the subject(s) are performing.

"Device-oriented technology" as used herein may refer to, but is not limited to, a system for detecting and/or identifying target user(s) or the subject(s) which assumes, but not necessarily, that the subject(s) are wearing a device but irrespective of these assumptions tracks the device rather the individual.

A "wireless protocol" as used herein may refer to, but is not limited to, a specification defining the characteristics of a wireless network comprising transmitters and receivers such that the receivers can receive and convert the information transmitted by the transmitters. Such specifications may therefore define parameters relating to the wireless network, transmitters, and receivers including, but not limited to, frequency range, channel allocations, transmit power ranges, modulation format, error coding, etc. Such wireless protocols may include those agreed as national and/or international standards within those regions of the wireless spectrum that are licensed/regulated as well as those that are unlicensed such as the Industrial, Scientific, and Medical (ISM) radio bands and hence are met by equipment designed by a single original equipment manufacturer (OEM) or an OEM consortium. Such wireless protocols may include, but are not limited to, IEEE 802.11 Wireless LAN and any of their amendments, IEEE 802.16 WiMAX, GSM (Global System for Mobile Communications, IEEE 802.15 Wireless PAN, UMTS (Universal Mobile Telecommunication System), EV-DO (Evolution-Data Optimized), CDMA 2000, GPRS (General Packet Radio Service), EDGE (Enhanced Data Rates for GSM Evolution), Open Air, HomeRF, HiperLAN1/HiperLAN2, Bluetooth, ZigBee, Wireless USB, 6IoWPAN, and UWB (ultra-wideband).

Figure 1:
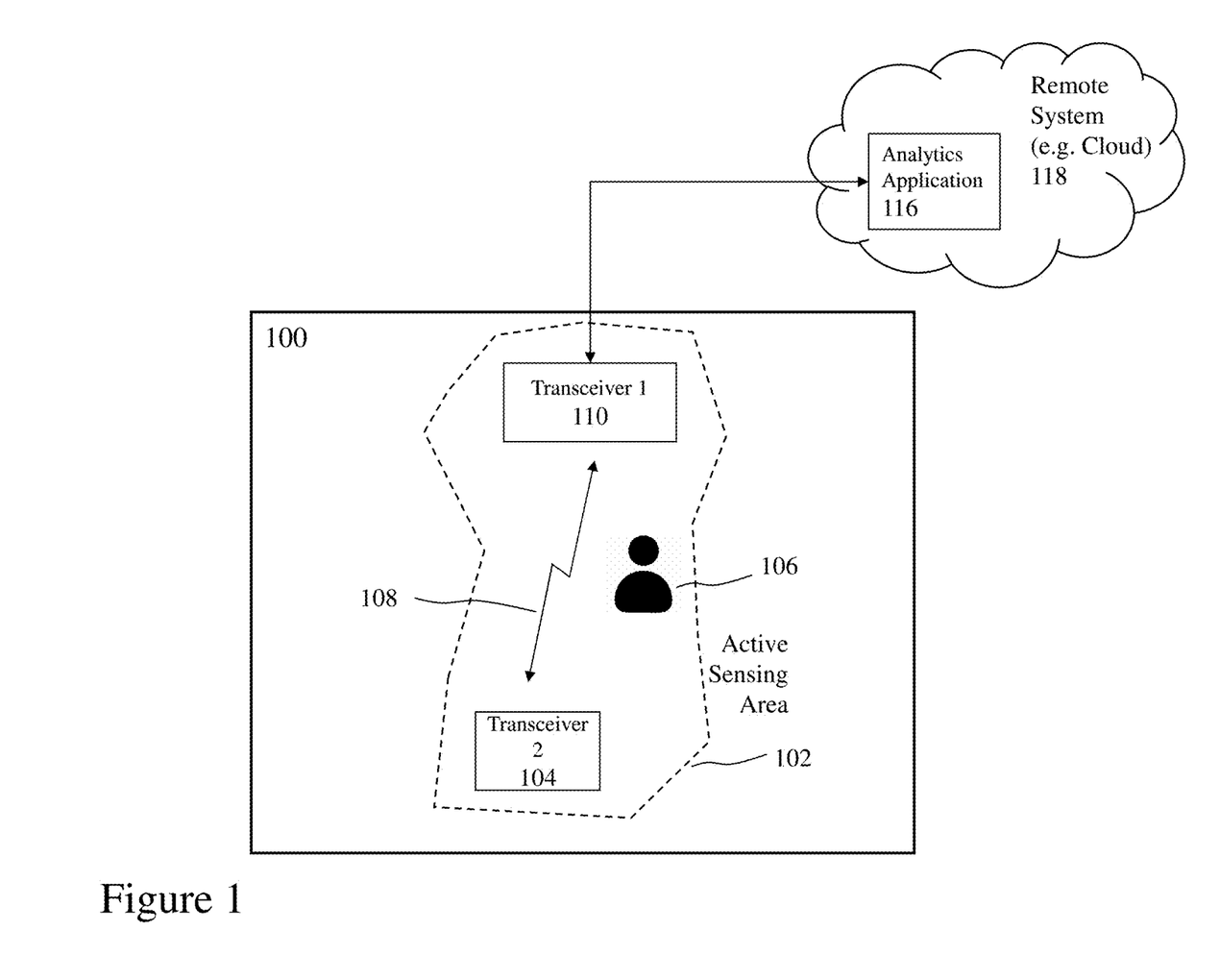
FIG. 1 depicts a simplified system schematic of a wireless environment according to an embodiment of the invention able to sense subject or subjects within a sensing area via wireless signals from a local infrastructure discretely or augmented by devices that the subject or subjects are carrying and/or wearing.

FIG. 1 depicts a simplified system schematic of a wireless environment according to an embodiment of the invention able to sense subject or subjects within a sensing area via wireless signals from a local infrastructure discretely or augmented by devices that the subject or subjects are carrying and/or wearing. The wireless device-free motion detection system is comprised of at least two transceivers 110 and 104. The transceivers 110 and 104 are associated through a wireless standard, e.g. Wi-Fi. Device-free motion detection is proven to be possible by looking at the appropriate metrics and/or measurements performed by any of the transceivers because moving objects distorts the wireless signals exchanged between transceivers.

These techniques being described within U.S. Patent Application 2020/0,333,425 filed Jul. 7, 2020 entitled "Device-Free Subject Localization Methods and Systems using Wireless Signals", the entire contents of which are incorporated herein by reference.

These techniques being described within U.S. Patent Application 2020/0,413,226 filed Sep. 14, 2020 entitled "Device-Free Localization Methods within Smart Indoor Environments", the entire contents of which are incorporated herein by reference.

These techniques being described within U.S. Patent Application 2019/0,213,857 filed Nov. 20, 2018 entitled "System and Methods for Smart Intrusion Detection using Wireless Signals and Artificial Intelligence", the entire contents of which are incorporated herein by reference.

These techniques being described within U.S. patent application Ser. No. 17/199,952 filed Mar. 12, 2021 entitled "System and Methods for Identifying a Subject Through Device-Free and Device-Orientated Sensing Technologies", the entire contents of which are incorporated herein by reference.

Accordingly, an area referred to as the active sensing area 102 is created by the wireless device-free motion detection system, e.g. between the two transceivers 110 and 104 or between the devices, which is sensitive to object motion, e.g. a user, an animal, a robot, or other moving object. Active sensing area 102 is within the perimeters of area 100 which could be any residential or commercial space and could include both indoors and outdoors spaces. The system proposed here in should contain at least one active sensing area 102. Integration of multiple sensing areas is considered as well as part of the system proposed herein. The wireless device-free motion detection system can compute the motion detection locally in the premise (not depicted for clarity), either through resources on a local area network (LAN, not shown for clarity), in any of the devices of the network, in a remote (e.g. cloud-based) computing resource (s) 118 through Analytics Application 116 as in FIG. 1, or a combination thereof.

The system is able to collect, through at least one of the devices in the network where the transceivers 110 and 104 are connected to, a wide range of information from all or any of the devices (e.g. transceivers 110 and 104) within the area 100. As an example, this information includes but is not limited to Physical Layer (PHY layer), Media Access Control (MAC) sublayer and Logical Link Control (LLC) sublayer which are the two sublayers of the Data Link (DL) Layer of the OSI model. The PHY layer and the DL layer contain information about the frequency response of the channel, and/or phase response of the channel, and/or impulse response of the channel, and/or received signal strength indicators (RSSI), and/or the media access control address (MAC address) and/or, capture of Probe requests, capture of any broadcasting frame before the association between devices, control frames after or before association between devices, any frame related to the association process, and/or any other statistic that describes the wireless communication link between paired devices.

The system in FIG. 1 exploits and quantifies physical motion occurring within the sensing area 102 by analyzing the changes and disruption of the wireless measurements collected from the devices, e.g. transceivers 110 and/or 104.

Figure 2:
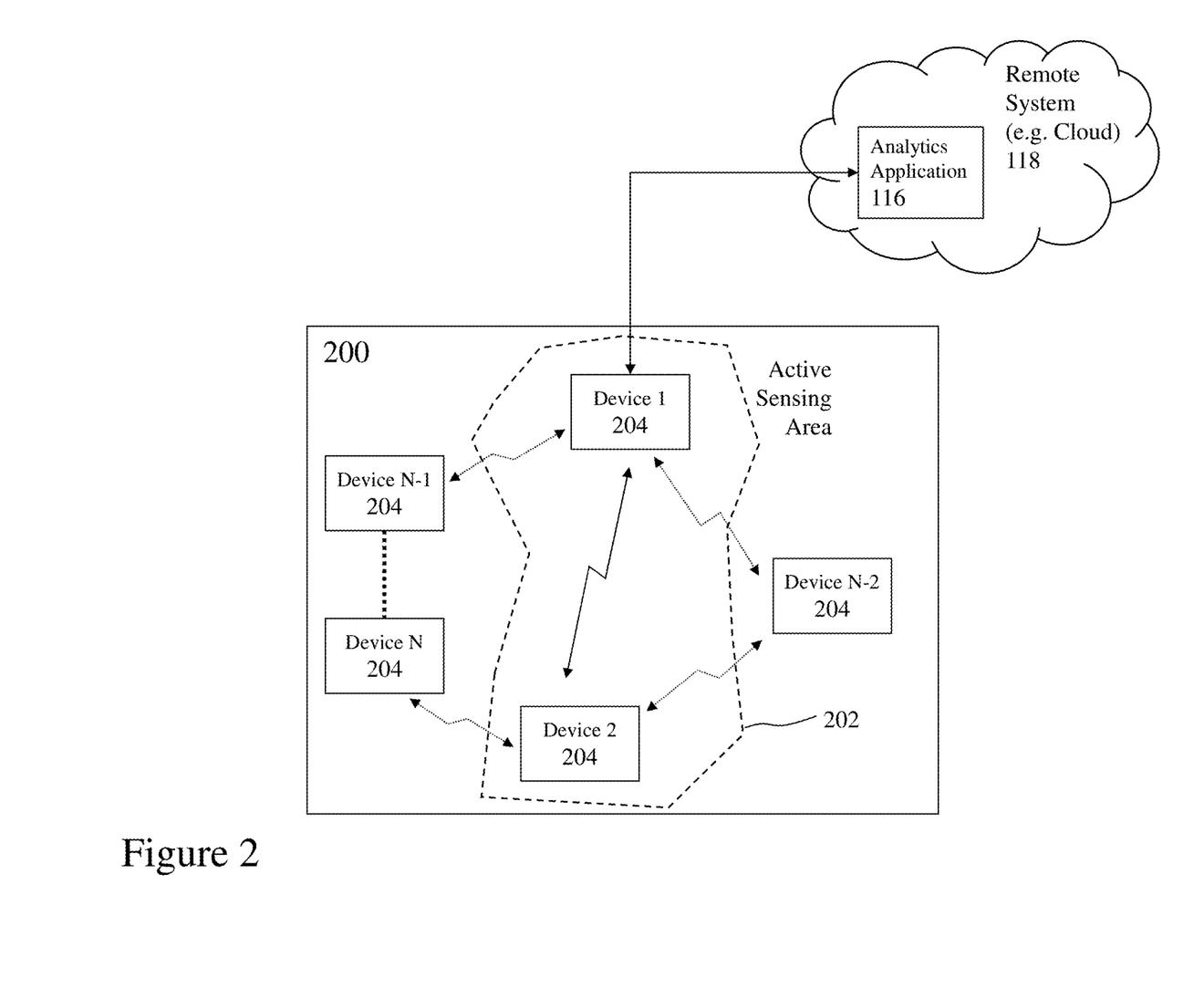
FIG. 2 depicts a simplified system schematic of a wireless environment according to an embodiment of the invention able to sense subject or subjects within a sensing area via wireless signals from a local infrastructure discretely or augmented by devices that the subject or subjects are carrying and/or wearing.

FIG. 2 depicts a simplified system schematic of a wireless environment according to an embodiment of the invention able to sense subject or subjects within a sensing area via wireless signals from a local infrastructure discretely or augmented by devices that the subject or subjects are carrying and/or wearing;

FIG. 2 depicts as an example and a more general network configuration that could exist. In one of the embodiments described herein a communication network 200 comprises at least two devices 204 as shown in FIG. 2. In this embodiment, devices 204 comprise the entire communication network. The devices 204 can act as a transceiver 110 and/or 104. By employing two instances of device 204, referred to as Device 1 and Device 2, a sensing area 202 is created as illustrated in FIG. 2. If part or all of the Analytics Application 116 is hosted in a remote system 118, then at least one of Device 1 or Device 2 needs to be capable of connecting to the remote network where the application 116 is hosted. If additional Devices 204, such as Device N−2, Device N−1, Device N etc., are incorporated into the sensing system, the active sensing area 202 is enhanced and/or extended according to the number and location of new devices available within the communication network 200 and their wireless communication range. Enhancement of the sensing area occurs as a result of the increase in the number of data sources available. Extension of the sensing area occurs as a result of the increase in overall reach of the communication network 200. The scope of the systems and methods proposed herein are not limited by any particular network topology. The communication network 200 could be created by following any of the regulated communication standards, e.g. IEEE 802.11 standard family, an unregulated communication standard, a proprietary standard, or a new standard.

Any of the transceivers 110 and/or 104 or any of the Devices 204, e.g. Device 1, Device 2, Device N-2, Device N-1, Device N, can read probing requests or any packet accordingly to any of the standards mentioned herein without being associated with the device carried by the subject. This information can be collected by any of the transceivers 110 and/or 104 or any of the Devices 204, e.g. Device 1, Device 2, Device N-2, Device N-1, Device N, and therein communicated to the Analysis Application 116 either directly or indirectly through other devices according to the connectivity of the devices to the Remote System 118 as depicted in FIG. 2. It would be apparent that the communications of the data acquired by the transceivers 110 and/or 104 or any of the Devices 204, e.g. Device 1, Device 2, Device N-2, Device N-1, Device N, may vary according to whether the analysis application which compute the motion detection for analysis is local within the premise, through resources on a LAN shown for clarity), in any of the devices of the network, in a Remote System 118, or a combination thereof. Whilst the data acquired is derived from one or more wireless standards the transceivers 110 and/or 104 or any of the Devices 204, e.g. Device 1, Device 2, Device N-2, Device N-1, Device N, may communicate this data using the same wireless standards, different wireless standards, ad-hoc associations, structured associations, wired networks, optical networks, or a combination thereof.

Figure 3:
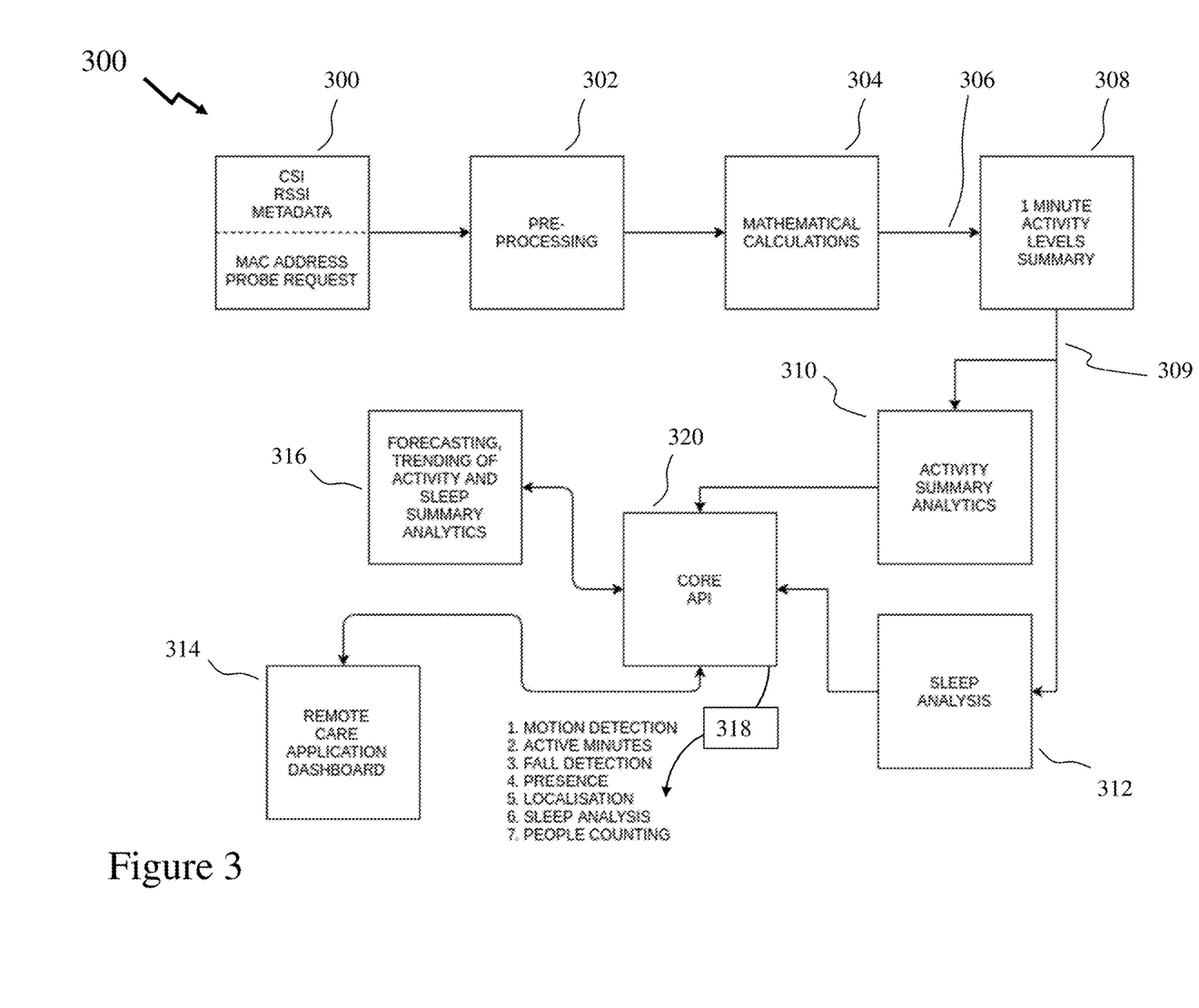
FIG. 3 depicts a simplified flow chart for a system processing remotely stored data which is processed to provide analytics for a remote care application according to an embodiment of the invention.

FIG. 3 depicts a simplified flow chart 300 for a system processing remotely stored data which is processed to provide analytics for a remote care application according to an embodiment of the invention comprising first to eighth elements 300 to 304 and 308 to 316 with a Core API 320 forming part of the processing. Accordingly, packets of data denoted by first element 300 which have received from one or more devices, e.g. transceivers 110 and/or 104 or any of the Devices 204, e.g. Device 1, Device 2, Device N-2, Device N-1, Device N, as described and depicted in FIG. 2 are passed to second element 302 for pre-processing, e.g. a series of filters to clean the noise and remove anomalous packets.

These cleaned packets from second element 302 are now fed to third element 304, mathematical calculations, for the estimation of a numerical value that shows the intensity of motion that a subject has caused in the sensing area resulting in output data, activity level 306. This activity level 306 is calculated in third element 304 by estimations resulting from application one or more of mathematical processes, neural networks, and classifiers.

The activity level 306 is now further processed in time dependent process represented by fourth element 308 to generate a flag every 1 minute, although other time bases may be employed, e.g. 15 seconds, 30 seconds, 2 minutes, 5 minutes, etc. to represent the summary of the activity levels in the last 1 minute called active minute in this example. This summary 309 indicates the meaningful estimation of motion. The details of the algorithm for summarization according to an embodiment of the invention are explained herein although it would be evident that other algorithms and methodologies may be applied without departing from the scope of the invention. The raw activity levels are first buffered at 1-minute intervals and their baselines are adjusted/corrected to the axis for uniformity across several devices and environments. This baseline corrected activities are now segmented into equal chunks. They are now analyzed separately at 3 levels. Each level feeds to the next through a series of statistical estimations and thresholds in a tree topological network of layers. The purpose of these layers is capture and aggregate a meaningful summarization of the activity and motion events across the entire 1 minute window. The result of this aggregation is to provide a binary flag to state if the minute was an active or an inactive window. These 1 minute decisions are then used in a combination to produce a multiple minute flag decision like 5 minutes, which is a broader version of the summarization.

The activity level summary 309 is now further processed to get more useful data which will be used to give the analysis of a subject including but not limited to several Activity Analysis, fifth element 310, and Sleep Analysis, sixth element 312, as described and depicted in FIG. 3. The internal workings to locate the input and output are described and depicted in FIG. 4. Accordingly, other analysis modules may be applied to determine other aspects of the user's behaviour, lifestyle, activities, physiological condition, etc.

The outputs from fifth element 310 and sixth element 312 are fed to the Core API, 314. The main function of Core API 314 being to handle input from the analysis modules such as fifth element 310 and sixth element 312 and output the information 318 to remote services etc. A seventh element 314, remote care application dashboard, also has bidirectional data transfer links with eighth element 316, forecasting and trending analysis of activity and sleep summary analytics for example, and Core API 320. Core API 320 is a unit whose function is to receive and transfer data. For example, the Core API 320 sources the data from fifth element 310 and feeds the seventh element 314, Remote Care Application. It is evident that the Core API 320 allows for several endpoints that include but not limited to outputting the information 318.

Eighth element 316 is used to produce trending, forecasting of data. Eighth element 316 has a bidirectional exchange of data with Core API 320 and does several statistical analyses to produce trends, forecasts to be displayed along the summaries, for example Summary 404 in FIG. 4 or Summary 506 in FIG. 5, which are displayed on the dashboard of the Remote Care Application, seventh element 314. The trends are produced considering the historical data for the corresponding day, week, and month. The statistical analysis makes usage of standard deviations, median, etc. to produce the typical behavior for the respective day, week, month. This helps identify if there is possible anomaly for the period in question. The forecasting also shows the expected trend in the typical range from 10% to 90% for the period in question The seventh element 314 refers to a Remote Care Application which has bidirectional data transfer links with Core API 320. Seventh element 314 may also, within embodiments of the invention, receives input/feedback from the subject to help improve the analytics and transfers to Core API 320. Seventh element 314 may display several features to portray results from the analytics of activity and sleep that are processed at fifth and sixth elements 310 and 312 respectively. The features are also described and depicted below in respect of FIGS. 6, 7, and 8 respectively.

Figure 4:
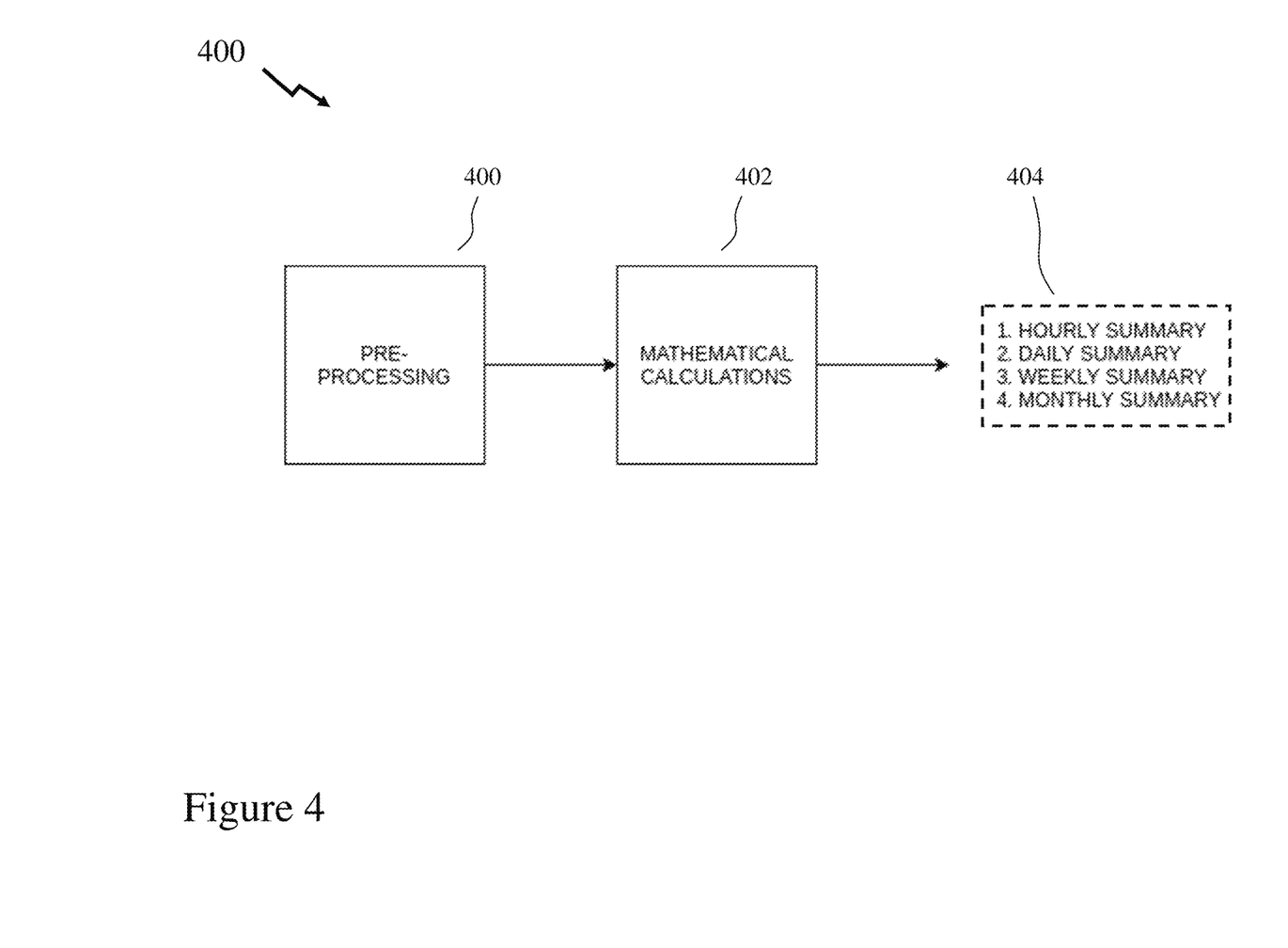
FIG. 4 depicts a simplified flow chart for a processing pipeline according to an embodiment of the invention establishing time based analytics for an activity summary according to an embodiment of the invention.

FIG. 4 depicts a simplified flow chart 400 for a processing pipeline according to an embodiment of the invention establishing time based analytics for an activity summary according to an embodiment of the invention. Flow chart 400 depicting the function of fifth element 310 in flowchart 300 in FIG. 3. As depicted it comprises first and second blocks 400 and 402. The active minutes summary received from fourth element 308 in FIG. 300 are further processed to produce daily, weekly, monthly summaries with methods explained herein. The first block 400 is a preprocessing block that involves the aggregation of multiple devices data positioned on the timeline of reception. Devices that are non-responsive and non-synchronous are ignored. The combination logic takes into all the parameters that have been involved in the production of activity summaries. Second block 402 performs mathematical calculations, analysis, classifications, etc. upon the output from first block 400. The second block 402 may yield multiple outputs as depicted in summary 404 such as hourly, daily, weekly, and monthly. The hourly summary is the sum of the active minutes in an hour. The daily summary is the sum of all these active minutes for the daily excluding the overnight activities. The weekly, monthly summary are inferred from the aggregation of daily activity summaries in a week and month respectively.

Figure 5:
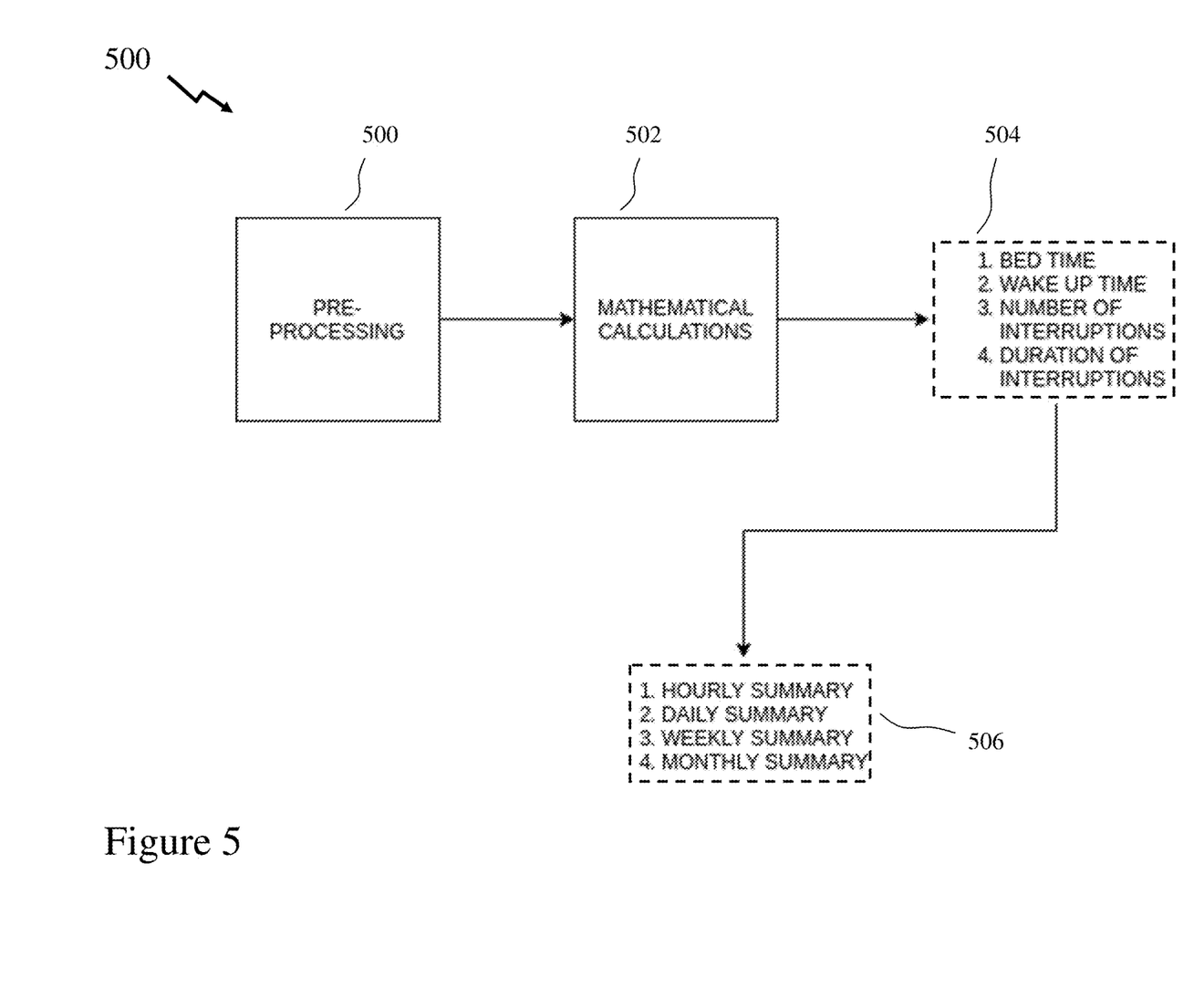
FIG. 5 depicts a simplified flow chart for a processing pipeline according to an embodiment of the invention establishing sleep based analysis for an activity summary according to an embodiment of the invention.

FIG. 5 depicts a simplified flow chart 500 for a processing pipeline according to an embodiment of the invention establishing sleep based analysis for an activity summary according to an embodiment of the invention. Flow chart 500 depicting the function of sixth element 312 in flowchart 300 in FIG. 3. Accordingly, the active minutes summary received from fourth element 308 in FIG. 300 are further processed to produce to make inferences with respect to the sleep of the subject, which is further used to produce daily, weekly, monthly summaries. As depicted the flow chart 500 comprises first and second blocks 500 and 502 respectively. First block 500 applies preprocessing which involves, but is not limited to, the aggregation of multiple devices' data positioned on the timeline of reception. Devices that are non-responsive and non-synchronous are ignored. The combination logic takes into all the parameters that have been involved in the production of activity summaries. First block 500 also performs time slicing which ignores some parts of the day that are irrelevant to the user daily night schedule. Second block 502 involves the implementation of the algorithms and analysis to make sleep inferencing possible.

The first step involves analysis of the active and inactive periods of the subject overnight. Behavioral analysis, historical data helps with the identification of patterns, cycles to help determine the time subject went to bed and the time subject woke up. A time series analysis with statistical features is performed on the amount of activity in an interval and appearance of these activities. Accordingly, an initial series of outputs 504 are established relating to that night. Amongst these the largest period possible that combines inactive periods is made to judge the most likely time the subject went to bed and woke up in the morning as referred to in outputs 504. This information is further used to analyze the number of times the sleep was interrupted in the night as a result of the subject waking up and producing activity and the duration of the interruption is evaluated.

The information from the series of outputs 504 is further used to produce a detailed daily summary including but not limited to time subject went to sleep, wake up time, number of interruptions, duration of these interruptions, historical anomalies if any which is pushed, for example, to the Remote Care Application represented by seventh block 314 in FIG. 3 or other remote services. Subsequently the flow chart generates, with blocks not depicted for clarity, weekly, monthly summaries show the aggregation of the results from the daily summary over a week and month respectively as referred herein combined outputs 506.

Figure 6:
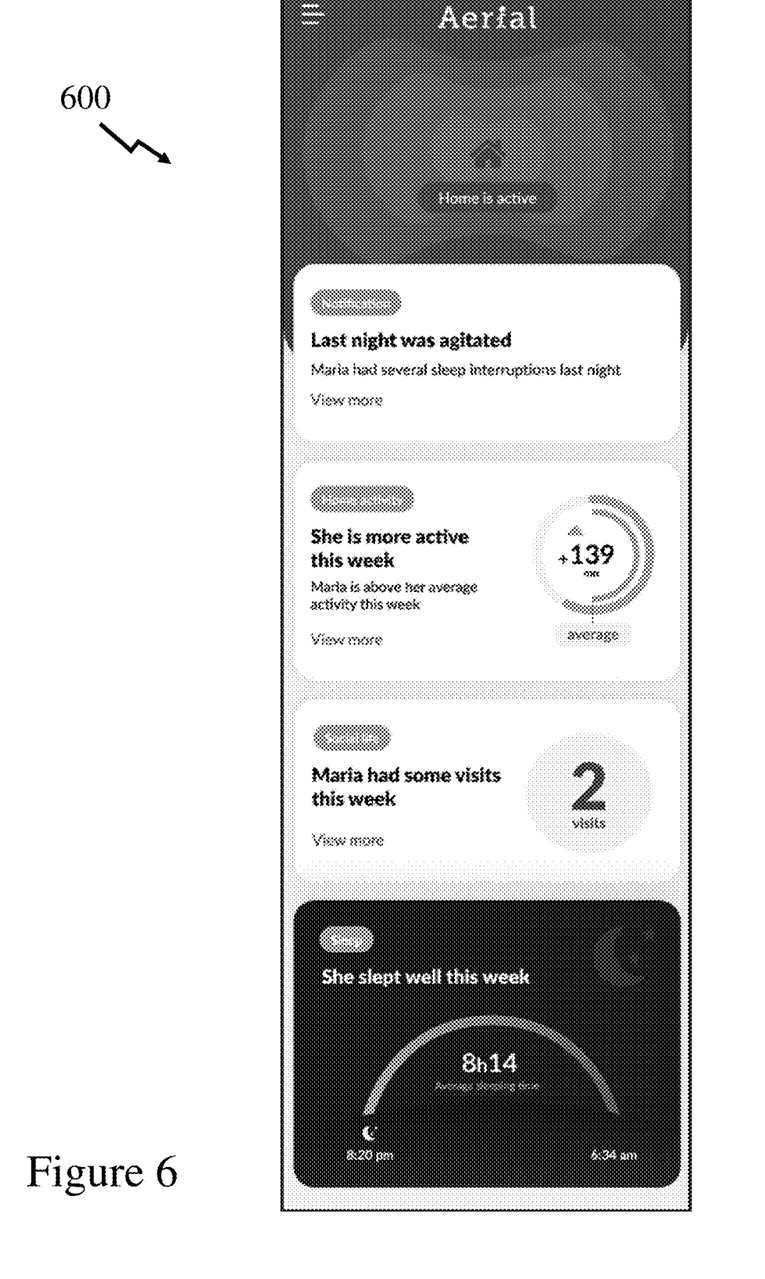
FIG. 6 depicts an illustrative home screen for a remote care software application according to an embodiment of the invention.

FIG. 6 shows an exemplary homepage 600 of an application dashboard such as for Remote Care Application depicted by seventh element 314 in FIG. 3. This application may be a mobile application, e.g. for a career, family member etc., or part of a desktop application, e.g. for a care facility, hospital, etc. The following description assumes a mobile application. The mobile application has a bidirectional data transfer link with a remote data store which the analysis from an analysis process executed upon wireless data such as that depicted in FIG. 3, for example information 318 or it has a bidirectional link with a Core API 320 such as depicted in FIG. 3. The data received is displayed directly on the mobile application screen. Homepage 600 depicts an overall summary of activity, sleep, and their related statistics. The features included but not limited to are overall activity of the monitored individual being shown with different color bands showing the intensity of motion detected, weekly summary of sleep analysis, activity analysis and special notification that may include any notable anomaly.

Figure 7:
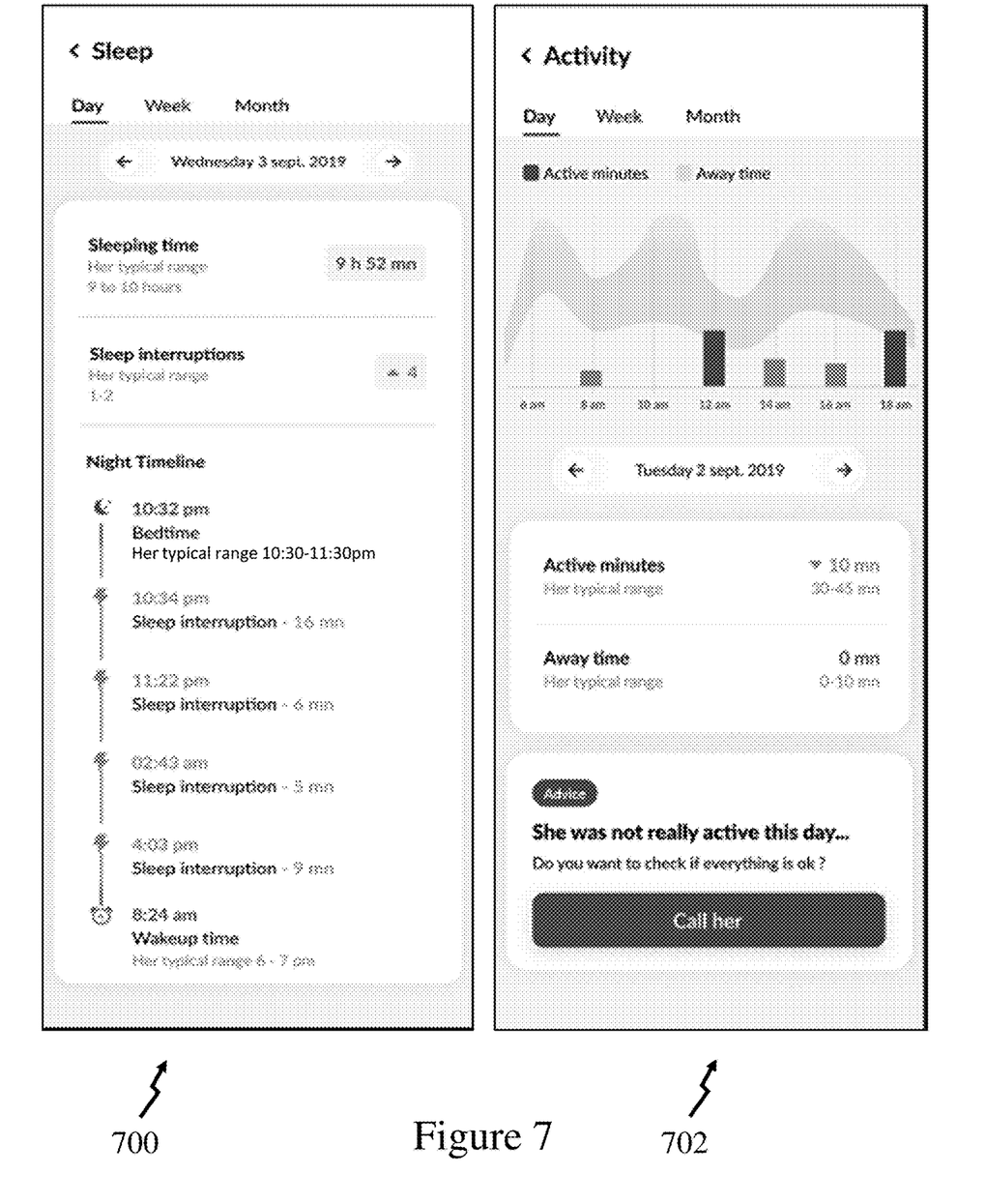
FIG. 7 depicts illustrative day view screens for activity analysis and sleep analysis within a remote care software application according to an embodiment of the invention.

FIG. 7 depicts illustrative first and second day view screens 700 and 702 for activity analysis and sleep analysis within a remote care software application according to an embodiment of the invention as displayed within an application dashboard. First day view screen 700 shows the daily sleep summary screen. The screen displays many features not limited to the amount of sleep in the night, the number of interruptions, the duration of interruptions, time the subject went to bed, time the subject woke up Second day view screen 702 shows the daily activity summary screen. The screen displays many features not limited to a plot showing the typical trend that is projected from historical data for that hour. The plot also shows the amount of activity calculated, for example using the data from the fourth element 308 of flow chart 300 in FIG. 3, for that period of hours. Second day view screen 702 also shows the total activity obtained, for example using the data from the fourth element 308 of flow chart 300 in FIG. 3. Second day view screen 702 also depicts the amount of time the subject was away from the sensing area, e.g. their home. It also features an anomaly detection notification and action commands.

Figure 8:
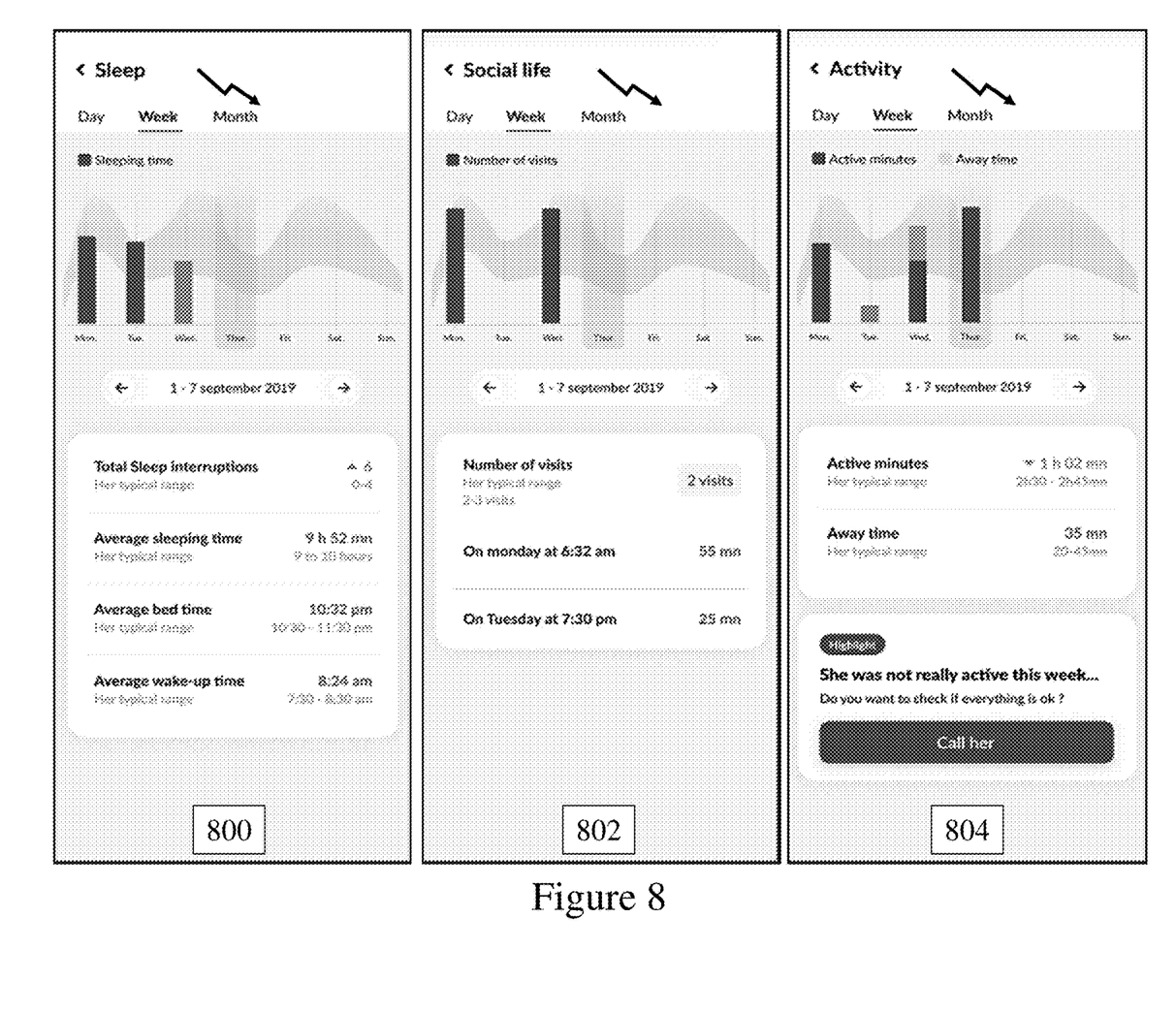
FIG. 8 depicts illustrative month view screens for activity analysis and sleep analysis within a remote care software application according to an embodiment of the invention.

FIG. 8 depicts illustrative first to third week view screens 800, 802 and 804 respectively for activity analysis and sleep analysis within a remote care software application according to an embodiment of the invention representing weekly summaries. First week view screen 800 shows the weekly summary of sleep. The screen displays many features including, but not limited to, a plot showing the typical trend that is projected from historical data and displaying expected trend for each day plotted over the week. The plot also shows the amount of sleep calculated from the daily summary of sleep. The screen displays many features not limited to the average amount of sleep in the night, the total number of interruptions in the week, the average time the subject went to bed, the average time the subject woke up.

Second week view screen 802 shows the social life analysis. It shows the number of visitations and the duration of each visit. The screen displays many features not limited to a plot showing the typical trend of visits that is projected from historical data for that day in the week. The plot also shows the number of visits for each day.

Third week view screen 804 shows the activity summary for the week. The screen displays many features not limited to a plot showing the typical trend of the week that is projected from historical data for each day. The plot also shows the amount of activity calculated per day. It also shows the total activity for the whole week derived from the number of active minutes per week, for example as obtained from flow chart 400 in FIG. 4 for example. The total amount of time the subject was away from the sensing area like their home for that week is also shown. It also features an anomaly detection notification and action command.

It would be evident that in dependence upon the data processed and generated by exemplary processes 300, 400 and 500 as depicted in FIGS. 3, 4 and 5 may be employed in dependence upon one or more other processes and/or one or more thresholds be employed to generate one or more alarms or alerts with respect to an individual being monitored within the environment.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
    acquiring data relating to wireless signals exchanged between a plurality of wireless devices within an environment;
    processing the acquired data with one or more processing modules of a plurality of processing modules to establish one or more characteristics relating to one or more users within the environment; and
    generating one or more summaries of a plurality of summaries in dependence upon the outputs of the plurality of processing modules; wherein
    each summary of the plurality of summaries employs outputs of a predetermined subset of the plurality of processing modules;
    processing the acquired data with one or more processing modules of a plurality of processing modules to establish one or more characteristics relating to one or more users within the environment comprises:
        continuously applying pre-processing via one or more pre-processing filters to remove noise within the acquired data and to remove anomalous packets within the acquired data;
        continuously applying one of more algorithms to the pre-processed acquired data to establish a series of numerical values, each numerical value relating to an intensity of motion of a subject within a sensing area established by the plurality of wireless devices;
        continuously establishing a series of raw activity levels of the subject by applying one or more processes to predetermined subsets of the series of numerical values, each process relating to the application of one of a mathematical process, a neural network, and a classifier; and
        establishing a consecutive series of activity levels, each activity level established for a predetermined time base in dependence upon applying further processing to a predetermined subset of the series of raw activity levels associated with an activity level of the consecutive series of activity levels;
    applying the further processing comprises:
        buffering the predetermined subset of the series of raw activity levels associated with the activity level of the consecutive series of activity level to generate a buffered set of raw activity levels;
        adjusting and correcting the baselines of the buffered set of raw activity levels to establish a set of baseline corrected activity levels;
        segmenting the set of baseline corrected activity levels into a set of chunks;
        analysing each chunk of the set of chunks with a sub-process comprising a series of layers to establish a set of summaries;
        establishing value of a binary flag in dependence upon the set of summaries; wherein
    each layer of the sub-process applies statistical estimations and thresholds and the series of layers form a tree topological network of layers; and
    the values of the binary flags are the consecutive series of activity levels.

2. The method according to claim 1, further comprising rendering the one or more summaries of a plurality of summaries to a user within a software application in execution upon an electronic device; wherein
    the user is established in dependence upon an individual associated with the environment.

3. The method according to claim 1, further comprising generating at least one of one or more alerts and one or more alarms in dependence upon a predetermined subset of the plurality of summaries.

4. The method according to claim 1, further comprising processing the plurality of summaries within one or more algorithms of a plurality of algorithms to determine at least one of a trend and an anomaly;
    generating at least one of one or more first alerts and one or more first alarms in dependence upon determining a trend; and
    generating at least one of one or more second alerts and one or more second alarms in dependence upon determining an anomaly.

5. The method according to claim 1, wherein
    the plurality of wireless signals exchanged are solely between the plurality of wireless devices and are independent of any other wireless device associated with an individual associated with the environment.

6. A method comprising:
    acquiring data relating to wireless signals exchanged between a plurality of wireless devices within an environment;
    processing the acquired data with one or more processing modules of a plurality of processing modules to establish one or more characteristics relating to one or more users within the environment;
    generating one or more summaries of a plurality of summaries in dependence upon the outputs of the plurality of processing modules; and
    establishing a consecutive series of other activity levels, each other activity level established for a predetermined other time base in dependence upon applying other processing to a predetermined subset of the consecutive series of activity levels; wherein
    each summary of the plurality of summaries employs outputs of a predetermined subset of the plurality of processing modules;

processing the acquired data with one or more processing modules of a plurality of processing modules to establish one or more characteristics relating to one or more users within the environment comprises:
  continuously applying pre-processing via one or more pre-processing filters to remove noise within the acquired data and to remove anomalous packets within the acquired data;
  continuously applying one of more algorithms to the pre-processed acquired data to establish a series of numerical values, each numerical value relating to an intensity of motion of a subject within a sensing area established by the plurality of wireless devices;
  continuously establishing a series of raw activity levels of the subject by applying one or more processes to predetermined subsets of the series of numerical values, each process relating to the application of one of a mathematical process, a neural network, and a classifier; and
  establishing a consecutive series of activity levels, each activity level established for a predetermined time base in dependence upon applying further processing to a predetermined subset of the series of raw activity levels associated with an activity level of the consecutive series of activity levels;
the further processing comprises:
  buffering the predetermined subset of the series of raw activity levels associated with the activity level of the consecutive series of activity level to generate a buffered set of raw activity levels;
  adjusting and correcting the baselines of the buffered set of raw activity levels to establish a set of baseline corrected raw activity levels;
  segmenting the set of raw baseline corrected activity levels into a set of chunks;
  analysing each chunk of the set of chunks with a sub-process comprising a series of layers to establish a set of summaries where each layer of the sub-process applies statistical estimations and thresholds and the series of layers form a tree topological network of layers; and
  establishing a flag in dependence upon the set of summaries;
the other processing comprises:
  buffering the predetermined subset of the series of activity levels associated with the activity level of the consecutive series of activity level to generate a buffered set of activity levels;
  adjusting and correcting the baselines of the buffered set of activity levels to establish a set of baseline corrected activity levels;
  segmenting the set of baseline corrected activity levels into a set of other chunks;
  analysing each other chunk of the set of other chunks with a sub-process comprising a series of layers to establish a set of summaries where each layer of the sub-process applies statistical estimations and thresholds and the series of layers form a tree topological network of layers; and
  establishing a flag in dependence upon the set of summaries;
the values of the binary flags are the consecutive series of activity levels; and
the values of the other binary flags are the consecutive series of other activity levels.

7. The method according to claim 6, further comprising rendering the one or more summaries of a plurality of summaries to a user within a software application in execution upon an electronic device; wherein
the user is established in dependence upon an individual associated with the environment.

8. The method according to claim 6, further comprising generating at least one of one or more alerts and one or more alarms in dependence upon a predetermined subset of the plurality of summaries.

9. The method according to claim 6, further comprising processing the plurality of summaries within one or more algorithms of a plurality of algorithms to determine at least one of a trend and an anomaly;
generating at least one of one or more first alerts and one or more first alarms in dependence upon determining a trend; and
generating at least one of one or more second alerts and one or more second alarms in dependence upon determining an anomaly.

10. The method according to claim 6, wherein
the plurality of wireless signals exchanged are solely between the plurality of wireless devices and are independent of any other wireless device associated with an individual associated with the environment.

11. A method comprising:
acquiring data relating to wireless signals exchanged between a plurality of wireless devices within an environment;
processing the acquired data with one or more processing modules of a plurality of processing modules to establish one or more characteristics relating to one or more users within the environment;
generating one or more summaries of a plurality of summaries in dependence upon the outputs of the plurality of processing modules; and
generating a series of sets of activity level summaries, each set of activity level summaries being a consecutive series of activity level summary data for a predetermined time duration of a set of predetermined time durations;
where each item of activity level summary data for a predetermined time duration within a consecutive series of activity level summary data for the predetermined time duration is established in dependence upon applying further processing to a predetermined subset of a previous set of activity level summaries for another predetermined time duration of the set of predetermined time durations; wherein
each summary of the plurality of summaries employs outputs of a predetermined subset of the plurality of processing modules;
each subsequent set of activity level summaries summarises over a longer predetermined time period of the set of predetermined time durations than the preceding set of activity level summaries; and
processing the acquired data with one or more processing modules of a plurality of processing modules to establish one or more characteristics relating to one or more users within the environment comprises:
  continuously applying pre-processing one or more pre-processing filters to remove noise within the acquired data and to remove anomalous packets within the acquired data;
  continuously applying one of more algorithms to the pre-processed acquired data to establish a series of numerical values, each numerical value relating to an intensity of motion of a subject within a sensing area established by the plurality of wireless devices;

continuously establishing a series of raw activity levels of the subject by applying one or more processes to predetermined subsets of the series of numerical values, each process relating to the application of one of a mathematical process, a neural network, and a classifier; and establishing a consecutive series of activity levels, each activity level established for a predetermined time base in dependence upon applying further processing to a predetermined subset of the series of raw activity levels associated with an activity level of the consecutive series of activity levels.

12. The method according to claim 11, further comprising
rendering the one or more summaries of a plurality of summaries to a user within a software application in execution upon an electronic device; wherein
the user is established in dependence upon an individual associated with the environment.

13. The method according to claim 11, further comprising
generating at least one of one or more alerts and one or more alarms in dependence upon a predetermined subset of the plurality of summaries.

14. The method according to claim 11, further comprising
processing the plurality of summaries within one or more algorithms of a plurality of algorithms to determine at least one of a trend and an anomaly;
generating at least one of one or more first alerts and one or more first alarms in dependence upon determining a trend; and
generating at least one of one or more second alerts and one or more second alarms in dependence upon determining an anomaly.

15. The method according to claim 11, wherein
the plurality of wireless signals exchanged are solely between the plurality of wireless devices and are independent of any other wireless device associated with an individual associated with the environment.

* * * * *